May 14, 1929. M. ST. CLAIR 1,713,357
OIL ATOMIZING NOZZLE
Filed Aug. 7, 1922
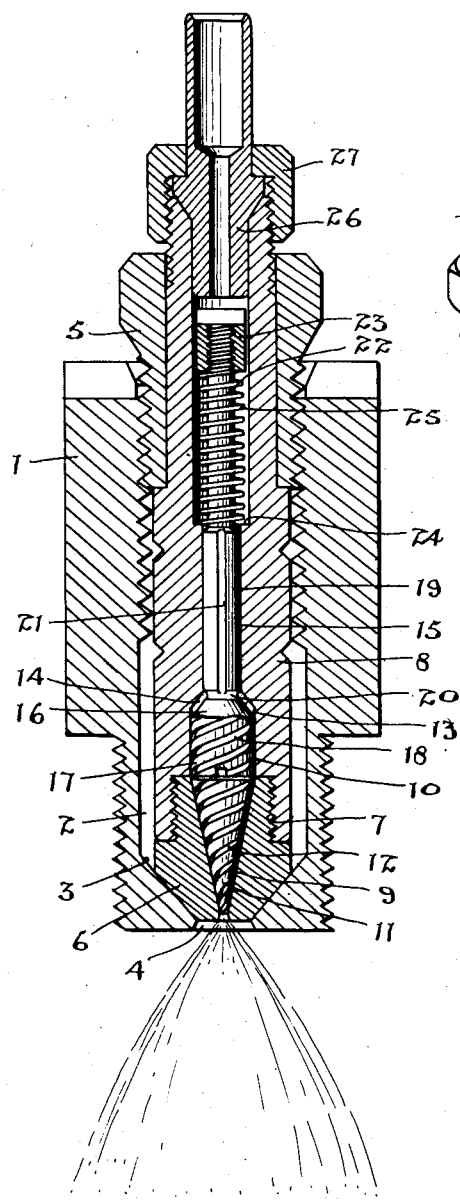
Inventor
Moffat St. Clair
by H. J. S. Dennison
Atty.

Patented May 14, 1929.

1,713,357

UNITED STATES PATENT OFFICE.

MOFFAT ST. CLAIR, OF GALT, ONTARIO, CANADA.

OIL-ATOMIZING NOZZLE.

Application filed August 7, 1922. Serial No. 580,362.

The principal objects of this invention are, to devise a nozzle structure which will effectively break up heavy oils into a fine spray and will not coke or become clogged nor be liable to back-firing.

A further object is to provide a structure of extremely simple design which may be very easily cleaned.

The principal feature of this invention consists in the novel formation of the nozzle core whereby the oil is conducted through spiral passages in the surface of a tapered core and a rotative action thus imparted causing it to be discharged in a whirling spray.

In the drawings, Figure 1 is an enlarged longitudinal sectional view of my improved nozzle construction showing the parts in the position of discharge.

Figures 2, 3, 4, 5, 6, 7, 8, 9, 10 and 11 are the various parts of the nozzle shown in perspective and in position ready to assemble.

This spray nozzle is intended to be secured in an engine cylinder and to project the oil in a fine spray into the interior and in the construction herein shown the body 1 is formed with a threaded reduced portion 2 having a cylindrical interior provided with a tapered inner end 3 leading to the opening 4 and the outer portion of the cylindrical orifice is internally threaded to receive the gland 5.

The nozzle end 6 is formed with a tapered end to fit the tapered inner end 3 in the body 1 and is formed with a reduced threaded portion 7 to fit into the stem 8.

The central orifice 9 in the nozzle end 6 is tapered preferably at an angle of 24 degrees which meets a correspondingly angular-shaped orifice 10 tapered inwardly. These angular surfaces meet very close to the discharge end of the nozzle and the discharging oil is not impeded by the edge of the nozzle opening.

Within the tapered orifice 9 is arranged a tapered plug 11 which is ground accurately to fit the tapered recess and is formed with a spiral grooved surface, the grooves 12 being preferably three in number extending from the base of the plug to the point. The oil entering these grooves under high pressure flows around the grooves and obtains a high rotative velocity so that when it is discharged through the opening 4 it has a whirling motion. It will be noted that the pitch of the grooves gradually increases to the point of the plug so that the movement of the oil having an initial impetus in the larger diameter is accelerated to the point of discharge owing to the decrease in diameter and increase in the length of the pitch.

The stem 8 to which the nozzle end 6 is secured is formed with a cylindrical valve chamber 13 communicating with the end of the plug and of substantially the same diameter and at the outer end this valve chamber is formed with a tapered valve seat 14 leading to a central cylindrical orifice 15.

A valve 16 is arranged within the valve chamber and is formed with a cylindrical end 17, the periphery of which is formed with grooves 18 of a corresponding pitch to the grooves 12 in the tapered plug. These grooves extend from the tapered seat of the valve so that upon the lifting of the valve from its seat the oil will flow through the grooves. The valve stem 19 is provided with a circumferential groove 20 at the bottom of the valve seat and longitudinal grooves 21 are formed in the stem of the valve operating in the central cylindrical orifice 15.

The outer end 22 of the valve stem is reduced and a nut 23 is threaded on its extremity.

The central orifice of the stem 8 is enlarged beyond the orifice 15 forming a shoulder 24 which is engaged by one end of the coil spring 25 encircling the valve stem 22. The outer end of the spring engages the nut 23 and exerts a spring pressure to hold the valve to its seat.

A nipple connection 26 is secured to the outer threaded end of the stem 8 by a nut 27.

This nozzle is secured to the engine cylinder and a tube connects the nipple 26 with the pressure fuel supply. Pressure is applied to the fuel intermittently and as such pressure is applied the fuel flowing through the grooves 21 lifts the valve 16 from its seat and flows through the circumferential grooves 18 in the cylindrical end of the valve and on through the circumferential grooves 12 in the plug 11.

The inner end of the plug is chamfered to ensure the free flow of oil from the grooves in the valve head 16. The pressure of the oil against the valve holds it tightly against the plug and it cannot rotate under the pressure but both valve and plug are free to move and rotate upon the initial impulse of the pressure. The spiral grooves will always remain true in their seats and a spiral motion is transmitted to the oil so that it is projected from the end of the nozzle in a whirling spray.

The device is extremely simple and owing to the high velocity of movement of the oil through the spiral grooves together with the rotative action of the plug, coking of the oils in the nozzle is absolutely prevented. The spiral grooves act as a screen to prevent explosions burning back into the nozzle.

What I claim as my invention is:

A nozzle, comprising, an outer casing having a tapered interior, a nozzle end tapered to fit the tapered interior of said casing and having a tapered opening therethrough, a stem secured to said nozzle end having a valve chamber therein and a central passage leading to the valve chamber, a spirally grooved tapered core fitting the tapered orifice in the nozzle end, a spirally grooved cylindrical member in the valve chamber having a valve seat to close said chamber, a stem leading from the valve seat through the central communicating passage, said stem having a plurality of longitudinal grooves therein, an enlarged chamber communicating with said central passage and forming a shoulder, a spiral spring encircling said valve stem and engaging the shoulder, and a nut secured to the valve stem and engaging the other end of said spring.

MOFFAT ST. CLAIR.